(12) United States Patent
Lee et al.

(10) Patent No.: US 9,164,732 B2
(45) Date of Patent: Oct. 20, 2015

(54) MULTIPLICATION METHOD AND MODULAR MULTIPLIER USING REDUNDANT FORM RECODING

(71) Applicant: SAMSUNG ELECTRONICS CO., LTD., Suwon-si (KR)

(72) Inventors: Yong Ki Lee, Yongin-si (KR); Sun-Soo Shin, Seoul (KR); Jonghoon Shin, Hwaseong-si (KR); Kyoung Moon Ahn, Seoul (KR); Ji-Su Kang, Seoul (KR); Kee Moon Chun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 17 days.

(21) Appl. No.: 14/139,113

(22) Filed: Dec. 23, 2013

(65) Prior Publication Data
US 2014/0192977 A1    Jul. 10, 2014

(30) Foreign Application Priority Data
Jan. 4, 2013 (KR) .................. 10-2013-0001227

(51) Int. Cl.
*H04L 29/06* (2006.01)
*G06F 7/72* (2006.01)
*H04L 9/30* (2006.01)

(52) U.S. Cl.
CPC ............. *G06F 7/722* (2013.01); *G06F 7/728* (2013.01); *H04L 9/302* (2013.01); *H04L 9/3013* (2013.01)

(58) Field of Classification Search
CPC .......... H04L 9/302; G06F 7/722; G06F 17/10
USPC ........................................................ 380/44
See application file for complete search history.

(56) References Cited

U.S. PATENT DOCUMENTS

| | | | |
|---|---|---|---|
| 5,473,559 A | 12/1995 | Makino | |
| 5,659,495 A | 8/1997 | Briggs et al. | |
| 6,397,238 B2 | 5/2002 | Oberman et al. | |
| 6,647,404 B2 | 11/2003 | Tzeng et al. | |
| 6,816,877 B2 | 11/2004 | Park et al. | |
| 6,826,587 B1 | 11/2004 | Montalvo et al. | |
| 7,519,646 B2 | 4/2009 | Kaul et al. | |
| 8,244,790 B2 | 8/2012 | Satoh et al. | |
| 2002/0103840 A1* | 8/2002 | Park et al. | 708/493 |
| 2003/0005016 A1* | 1/2003 | Tzeng et al. | 708/628 |
| 2003/0158880 A1 | 8/2003 | Ng | |
| 2004/0177105 A1* | 9/2004 | Satoh et al. | 708/620 |
| 2004/0225702 A1* | 11/2004 | Son | 708/492 |
| 2008/0104164 A1 | 5/2008 | Kaul et al. | |
| 2011/0231467 A1* | 9/2011 | Ahn et al. | 708/491 |
| 2011/0276790 A1* | 11/2011 | Olson et al. | 712/222 |

FOREIGN PATENT DOCUMENTS

JP        5088854 B2    12/2012
KR   10-2002-0047509 A    6/2002

* cited by examiner

*Primary Examiner* — Dao Ho
(74) *Attorney, Agent, or Firm* — Sughrue Mion, PLLC

(57) ABSTRACT

A multiplication method and a modular multiplier are provided. The multiplication method includes transforming a redundant-form multiplier by adding a recoding constant to the multiplier, performing recoding by using the transformed multiplier, and performing partial multiplication between the multiplier and a multiplicand using result values of the recoding.

11 Claims, 4 Drawing Sheets

MULTIPLICATION METHOD AND MODULAR MULTIPLIER USING REDUNDANT FORM RECODING

CROSS-REFERENCE TO RELATED APPLICATIONS

This application claims priority under 35 U.S.C. §119 from Korean Patent Application No. 10-2013-0001227, filed on Jan. 4, 2013, the entire contents of which are hereby incorporated by reference.

BACKGROUND

Methods, devices, and articles of manufacture consistent with the present disclosure relate to a multiplication method and modular multiplier using redundant form recoding.

Representative examples of public key encryption algorithms are Rivest, Shamir, and Adleman (RSA) and ecliptic curve cryptosystem (ECC). RSA is based on a difficulty of an integer factorization problem, and ECC is based on a difficulty of an elliptic curve discrete logarithm problem (ECDLP). One of the most basic operations for implementing the RSA or ECC is a modular operation. The performance of the RSA or ECC may be influenced by a modular arithmetic unit that implements the modular operation. That is, as the performance of the modular arithmetic unit increases, the performance of the RSA or ECC based on the modular operation may be improved.

SUMMARY

One or more exemplary embodiments provide a multiplication method for increasing a calculation speed and a modular multiplier using the same.

According to an aspect of an exemplary embodiment, there is provided a multiplication method including transforming a redundant-form multiplier by adding a recoding constant to the multiplier, performing recoding by using the transformed multiplier, and performing partial multiplication between the multiplier and a multiplicand using result values of the recoding.

The recoding constant may be '1010 ... 1010' having the same bit size as the multiplicand.

The transforming of the redundant-form multiplier may include performing an operation bitwise, wherein each bitwise operation value of the transformed multiplier may include a 2-bit sum bit and a 1-bit carry bit.

The transforming of the redundant-form multiplier may include performing an operation bitwise, wherein the bitwise operation may include full addition, half addition, and modified half addition, and the modified half addition may include adding a first input bit, a second input bit, and 1.

The transforming of the redundant-form multiplier may include performing an operation bitwise, wherein the bitwise operation may include inverting and full addition.

Each of bitwise operation values $r_i$ may satisfy the following equation:

$$0 \leq r_i \leq 4$$

Each of result values of the recoding may be determined to be one of 0, the multiplicand, a 2's compliment of the multiplicand, a shifted value of the multiplicand, and a 2's compliment of the shifted value.

The performing of the recoding may satisfy the following equation:

$$B' = B'_C + B'_S = B_C + B_S + 1010 \ldots 1010$$

$$C = A \cdot B = A \cdot (B_S + B_C)$$

$$= \sum_{i=0}^{\lfloor n/2 \rfloor} A \cdot (2s'_{2i+1} + s'_{2i} + c'_{2i} - 2) \cdot 2^{2i}$$

$$= \sum_{i=0}^{\lfloor n/2 \rfloor} P_{2i} \cdot 2^{2i}$$

where A is the multiplicand, B is the multiplier, n is a bit size of the multiplicand, $P_{2i}=(2s'_{2i+1}+s'_{2i}+c'_{2i}-2)A$, $B'_S = \sum_{i=0}^{n} s'_i 2^i$, $B'_C = \sum_{i=0}^{n} c'_i 2^i$, $c'_i = 0$ when i is an odd number, $P_{2i}$ is a partial product, $B'_S$ is a sum bit of the transformed multiplier, and $B'_C$ is a carry bit of the transformed multiplier.

According to an aspect of another exemplary embodiment, there is provided a modular multiplier that includes a partial multiplication unit configured to multiply a multiplier and a multiplicand bit, a modulus multiplication unit configured to multiply a modulus and a transformed quotient bit, an accumulator configured to receive a previous accumulated value and output values of the partial multiplication unit and the modulus multiplication unit, and calculate an accumulated value according to a Montgomery algorithm, a register configured to store the calculated accumulated value, and a quotient generator configured to generate a quotient using the previous accumulated value, wherein the transformed quotient bit has a value obtained by recoding a redundant-form quotient.

The modular multipliers may further include a first recoding unit configured to transform the previous accumulated value by adding a recoding constant to the redundant-form previous accumulated value, and recode the transformed previous accumulated value, and a second recoding unit configured to transform the redundant-form quotient by adding the recoding constant thereto, and recode the transformed quotient.

Each of the first and second recoding units may include a first column in which half adders and modified half adders are repeatedly alternately arranged, and a second column in which full adders and half adders are repeatedly alternately arranged, wherein the modified half adder may add a first input bit, a second input bit, and 1.

Each of the first and second recoding units may include a first column in which inverters are intermittently arranged, and a second column in which full adders are repeatedly arranged.

A size of the accumulated value may be the same as a size of the multiplier bit and a size of the quotient bit.

The quotient generator may use a value obtained by recoding a least significant digit of the previous accumulated value as a multiplier.

The value obtained by recoding the least significant digit may exist in a redundant form.

A size of the least significant digit may be determined by a radix.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION OF EXEMPLARY EMBODIMENTS

Figure 1:
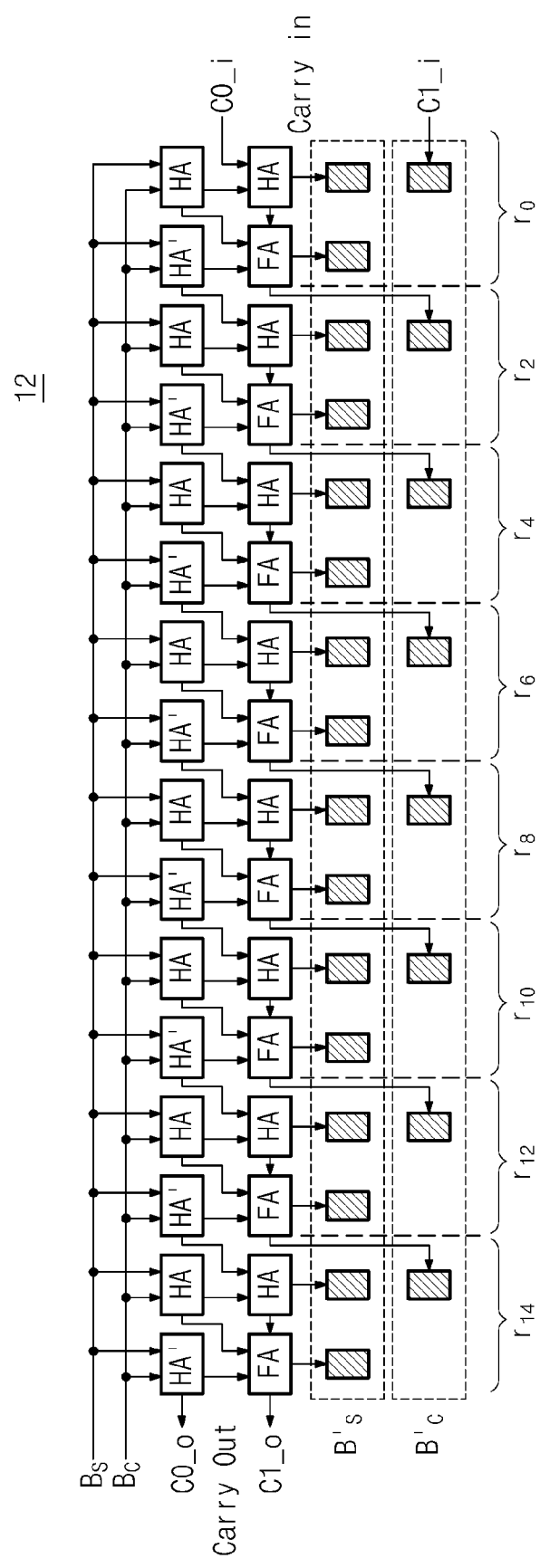
FIG. 1 is a diagram illustrating an example of a redundant-form recoding transformation unit according to a first exemplary embodiment.

Exemplary embodiments will be described below in more detail with reference to the accompanying drawings. The inventive concept may, however, be embodied in different forms and should not be construed as limited to the exemplary embodiments set forth herein. Rather, these exemplary embodiments are provided so that this disclosure will be thorough and complete, and will fully convey the scope of the inventive concept to those skilled in the art.

Hereinafter, exemplary embodiments will be described in detail with reference to the accompanying drawings.

A multiplication operation may be defined by a sum of partial products. This may be expressed as Equation (1) below.

$$C = A \cdot B = \sum_{i=0}^{n-1} Ab_i 2^i \quad (1)$$

where $B = \sum_{i=0}^{n-1} b_i 2^i$

In the above equation, partial products are $Ab_0 2^0 \ldots Ab_{n-1} 2^{2-1}$. If $b_i = 0$, summation is not necessary. Therefore, n/2 number of partial products on average are generated, and in the worst case, n number of partial products may be generated. By adding such partial products, a final result of a multiplying operation is generated. If the number of the partial products is reduced, the multiplying operation may be simplified.

A recoding scheme may be used to reduce the number of partial products. The recoding substitutes an original value of a multiplier with another value that is mathematically equivalent thereto in order to efficiently perform multiplication. Booth recoding is a representative method for such a recoding operation.

When Booth recoding is applied, n/3 number of partial products on average are generated, and in the worst case, n/2 number of partial products are generated. However, in the case of Booth recoding, a bit phase of a generated partial product is variable. In order to implement Booth recoding using hardware, physical implementation is necessary for all variable situations. Therefore, it is difficult to obtain the effects of structural simplification and performance improvement due to the variable partial product generated in Booth recoding. This limitation may be overcome by using a modified Booth recoding such that physical implementation using hardware is made easier. However, in the case of modified Booth recoding, the number of partial products is fixed to n/2, and a bit phase of a generated partial product is also fixed, thus losing the improvement in partial products.

However, for the above-mentioned Booth recoding or modified Booth recoding, it is basically assumed that a multiplier to be recoded is in a non-redundant form. That is, one multiplier value is represented by one number. However, the multiplier may exist in a redundant form. That is, one multiplier value may exist in a form of addition of two numbers. When the multiplier exists in the redundant form, a multiplying operation may be represented as Equation (2) below.

$$A \times B = A \times (B_C + B_S) \quad (2)$$

where A denotes a multiplicand, B denotes a multiplier, $B_C$ denotes a carry of the multiplier, and $B_S$ denotes a sum of multipliers.

Such a redundant-form multiplier is frequently generated when a carry-save-adder (CSA) is used in a logic circuit such as an accumulator. By representing a carry generated at a lower bit with an additional number without propagating the carry to an upper bit, a propagation delay is remarkably reduced. Therefore, when a size of a word is large, such as in the case of a public key encryption operation, an intermediate result value is expressed in the redundant form. For example, the intermediate result value may be expressed as a sum of a previous accumulated value and a partial product.

In order to recode the multiplier B that exists in the redundant form as expressed in Equation (2), the multiplier is transformed into a non-redundant form. In this case, an addition operation may be used for such a transformation process. However, the delay complexity and area complexity may be greatly increased depending on the method of the addition operation.

In order to reduce such overhead, redundant Booth recoding has been proposed. According to the redundant Booth recoding, a redundant-form multiplier is received and transformed into a Booth recoding value. Since a propagation delay for the recoding is fixed regardless of a bit size of a multiplier, the overhead of the propagation delay may be greatly improved. However, the redundant Booth recoding has a disadvantage in that it uses much more hardware than a ripple carry adder (RCA) that is a minimum-sized adder for performing addition.

According to an exemplary embodiment, there is proposed a method of recoding a redundant-form multiplier ($B = B_C + B_S$) through a simple transformation, so that a multiplying operation may be performed without transformation into a non-redundant form. As a result, a multiplication method according to an exemplary embodiment may remarkably reduce the delay complexity and the area complexity in comparison with an addition operation used for a typical multiplication method. Further, in comparison with redundant Booth recoding, the multiplication method may be implemented with a small amount of hardware. An exemplary embodiment of the inventive concept may be applied to all calculators that perform multiplication. In particular, when a multiplier exists in a redundant form, calculator performance may be remarkably improved and/or hardware complexity may be remarkably reduced.

In addition, a method of multiplying a redundant-form multiplier may be appropriately applied to a Montgomery multiplier used in a public key calculator.

Pipelining has been used in order to reduce the delay complexity of a public key calculator. However, pipelining needs a large amount of hardware and additional post-processing, causing overhead. In exemplary embodiments, the method of multiplying a redundant-form multiplier is applied to the Montgomery multiplier (or public key calculator) so as to basically overcome the limitation of additional overhead.

Simple Transformation for Redundant-Form Recoding

In order to perform redundant-form recoding (RFR), redundant-form recoding transformation (hereinafter, referred to as RFR-transformation) is performed. This RFR-transformation may be performed in such a manner that a specific RFR constant is added to a multiplier B and a result of the addition is converted to a specific RFR form.

In an exemplary embodiment, the specific RFR constant is '1010 . . . 1010'. Here, a bit size of the RFR constant may be the same as a size of an operand (or multiplicand).

Firstly, it is assumed that the multiplier B to be recoded exists in a redundant form as Equation (3) below.

$$B = B_C + B_S \quad (3)$$

Here, when a transformed multiplier B' is obtained by adding the specific RFR constant to the multiplier B, the transformed multiplier B' may be expressed as a following equation. In the below equation, it is assumed that the transformed multiplier B' exists in a redundant form as Equation (4) below.

$$B' = B'_C + B'_S = B_C + B_S + 1010 \ldots 1010 \quad (4)$$

where $B'_C$ denotes a carry of the transformed multiplier B', and $B'_S$ denotes a sum of the transformed multipliers B'.

This RFR-transformation process may be implemented with a simple hardware structure.

FIG. 1 is a diagram illustrating an example of a redundant-form recoding transformation unit that implements an RFR-transformation process with a hardware structure according to a first exemplary embodiment. Referring to FIG. 1, a redundant-form recoding transformation unit 12 includes a first column in which modified half adders HA's and half adders HAs are repeatedly alternately arranged, and a second column in which full adders FAs and half adders HAs are repeatedly alternately arranged. Here, the full adder FA, half adder HA, and modified half adder HA' may be expressed as Equation (5) below.

$$FA(a,b,c) = a + b + c$$

$$HA(a,b) = a + b$$

$$HA'(a,b) = a + b + 1 \quad (5)$$

where a and b denote input bits, and c denotes a carry bit of an adjacent half adder HA.

The redundant-form recoding transformation unit 12 illustrated in FIG. 1 may be optimized in order to reduce a hardware size.

Figure 2:
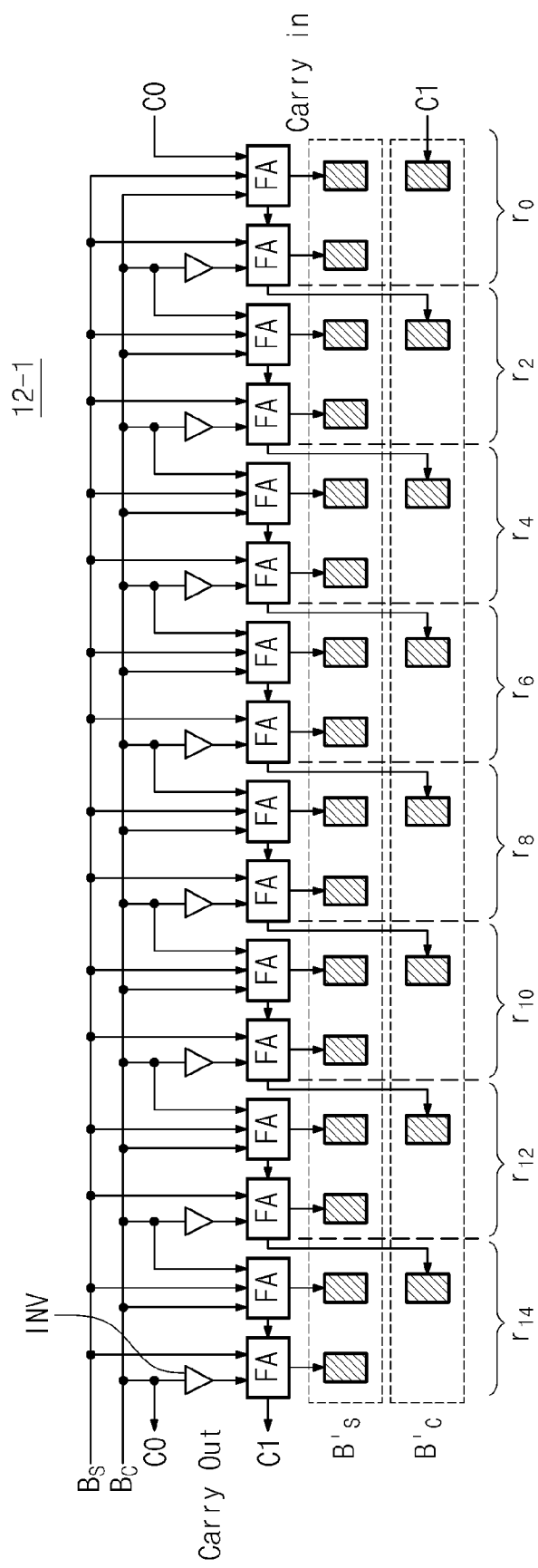
FIG. 2 is a diagram illustrating an example of a redundant-form recoding transformation unit according to a second exemplary embodiment.

FIG. 2 is a diagram illustrating an example of a redundant-form recoding transformation unit that implements an RFR-transformation process with a hardware structure according to a second exemplary embodiment. Referring to FIG. 2, a redundant-form recoding transformation unit 12-1 includes a first column in which inverters INVs are intermittently arranged, and a second column in which full adders FAs are continuously arranged. A structure of the redundant-form recoding transformation unit 12-1 is obtained by optimizing the redundant-form recoding transformation unit 12 illustrated in FIG. 1.

In this exemplary embodiment, in a design complier of a hardware description language (HDL), an AND gate is changed to a NAND gate and an OR gate is changed to a NOR gate, and thus the inverter INV does not cause overhead typically. Therefore, the redundant-form recoding transformation unit 12-1 may be implemented with hardware having almost the same size as the RCA that is an adder having the smallest hardware size.

The redundant-form recoding units 12 and 12-1 may perform operations on a bit basis. For example, each of bitwise operation values $r_0, r_2, r_4, r_6, r_8, r_{10}, r_{12},$ and $r_{14}$ may be output as a carry 1 bit (leftward output signal in FIGS. 1 and 2) and a sum 1 bit (downward output signal in FIGS. 1 and 2).

Referring to Equation (5), an RFR constant is added to the input bits a and b through the modified half adder HA'.

RFR-transformation operation values are output in the forms of $r_0, r_2, r_4, r_6, r_8, r_{10}, r_{12},$ and $r_{14}$ as illustrated in FIGS. 1 and 2. Each operation value $r_i$ includes a 2-bit sum ($B'_S$) of transformed multipliers and a 1-bit carry ($B'_C$) of a transformed multiplier. A maximal value of the 2-bit sum ($B'_S$) of transformed multipliers is 3, and the 1-bit carry ($B'_C$) of a transformed multiplier is 1. Therefore, a range of the operation value $r_i$ may be expressed as Equation (6) below.

$$0 \leq r_i \leq 4 \quad (6)$$

Redundant-Form Recoding

Each result value $r_i$, i.e. a combination of $s'_{2i+1}$, $s'_{2i}$, and $c'_{2i}$, may be recoded with Equation (7) as follows.

$$C = A \cdot B = A \cdot (B_S + B_C) \quad (7)$$

$$= \sum_{i=0}^{\lfloor n/2 \rfloor} A \cdot (2s'_{2i+1} + s'_{2i} + c'_{2i} - 2) \cdot 2^{2i}$$

$$= \sum_{i=0}^{\lfloor n/2 \rfloor} P_{2i} \cdot 2^{2i}$$

where
$P_{2i} = (2s'_{2i+1} + s'_{2i} + c'_{2i} - 2)A$,
$B'_S = \sum_{i=0}^{n} s'_i 2^i$, $B'_C = \sum_{i=0}^{n} c'_i 2^i$, $c'_i = 0$ when i is an odd number In Equation (7), '−2' denotes a value for compensating for a value of 2 that has been added through the redundant-form recoding transformation. As a result, since a value of 2 is subtracted from $r_i$ having a value of [0, 4], a value of a partial product ($P_{2i}$) may be determined to be one of $\{-2A, -A, 0, A, 2A\}$. Here, −A denotes a 2's compliment of the multiplicand A, −2A denotes a shifted value of −A, and 2A denotes a shifted value of the multiplicand A.

These recoding result values may be the same as result values of modified Booth recoding. A recoding formula according to an exemplary embodiment may be expressed as in the following Table 1.

TABLE 1

| $s'_{2i+1}$ | $s'_{2i}$ | $c'_{2i}$ | Partial product $P_{2i}$ |
|---|---|---|---|
| 0 | 0 | 0 | −2A |
| 0 | 0 | 1 | −A |
| 0 | 1 | 0 | −A |
| 0 | 1 | 1 | 0 |
| 1 | 0 | 0 | 0 |
| 1 | 0 | 1 | A |
| 1 | 1 | 0 | A |
| 1 | 1 | 1 | 2A |

Implementation Complexity

Implementation complexities of a related art modified Booth recoding and the RFR recoding according to an exemplary embodiment may be compared in terms of area complexity and delay complexity.

Figure 3:
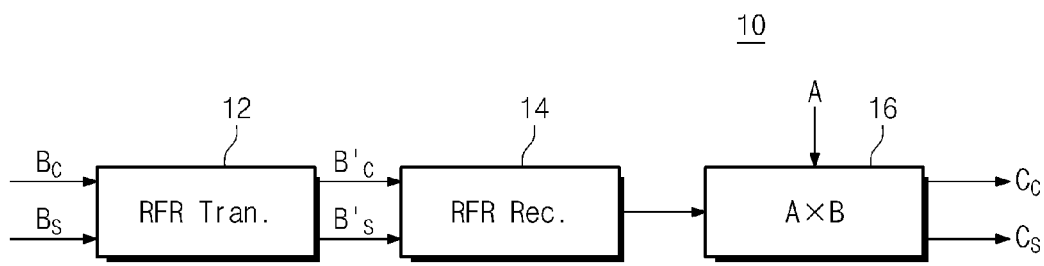
FIG. 3 is a block diagram illustrating an example of a multiplier according to an exemplary embodiment.

FIG. 3 is a block diagram illustrating an example of a multiplier that performs redundant-form recoding according to an exemplary embodiment. Referring to FIG. 3, the multiplier 10 includes a redundant-form recoding transformation unit (RFR Tran.) 12, a redundant-form recoding unit (RFR Rec.) 14, and a partial multiplication unit (A×B) 16.

In the case of related art recoding such as modified Booth recoding, a process for transforming a redundant-form multiplier into a non-redundant form (e.g. non-adjacent form transformation (NRF-transformation)) should be performed. By contrast, in the case of the redundant-form recoding according to an exemplary embodiment, the RFR-transformation is used.

Since the NRF-transformation is implemented by an addition operation, a degree of complexity depends on the adder that is used. Therefore, the RCA optimized to an area and the CSA optimized to a delay are compared below. As shown in the following Table 2, the RCA and the CSA that may be used for the NRF-transformation are compared in terms of the area complexity and delay complexity for the RFR-transformation.

TABLE 2

|  | RCA | CSA | RBR | RFR |
| --- | --- | --- | --- | --- |
| Area complexity | $\theta(n)$ | $\theta(n\log n)$ | $\theta(n)$ | $\theta(n)$ |
| Delay complexity | $\theta(n)$ | $\theta(\log n)$ | $\theta(1)$ | $\theta(1)$ |
| Area-delay efficiency | $\theta(n^2)$ | $\theta(n(\log n)^2)$ | $\theta(n)$ | $\theta(n)$ |

Referring to Table 2, it may be understood that the area complexity of the RFR-transformation is the same as that of the smallest adder, i.e. RCA, and the delay complexity is far smaller than that of the fastest adder, i.e. CSA. Also in terms of area-delay efficiency obtained by multiplying the area complexity and the delay complexity, the RFR-transformation is more efficient.

The related art redundant Booth recoding (RBR) has the same area and delay complexities as the RFR in $\theta(\ )$ representation. However, the RFR is more advantageous and less complex in terms of actual hardware complexity. That is, when complexity is expressed by $\theta(\ )$, a constant coefficient is ignored. As described above, the RFR-based hardware configuration according to exemplary embodiments may be used the same as that of the ripple-carry adder, meaning that the RFR may be implemented with minimal hardware.

Further, the RFR has a process of adding a constant of '1010 . . . 1010', and this may be preprocessed in some cases. Therefore, according to a structure of hardware and equations to be calculated, the addition of '1010 . . . 1010' may be excluded from a hardware configuration. Thus, in this case, hardware may be more simple.

Applying Redundant-Form Recoding to Public Key Calculator

A basic operation of a public key calculator is modular multiplication, and a multiplicand is very large. Thus, applying the RFR to the public key calculator may be an optimal application. For example, in the case of RSA public key operation, multiplication of at least 1024 bits is included.

One of the most widely used algorithms for public key operation is a Montgomery multiplication algorithm in which a modular operation may be efficiently performed. The Montgomery multiplication algorithm may be described as below.

---
Algorithm Montgomery Multiplication

---
Input: $0 \leq A,B < 2M$ where $B = \Sigma_{i=0}^{n-1} b_i 2^{ki}$ and
$b_i \in \{0,1,...,2^k - 1\}$
$2^{r-1} < M < 2^r$ where $r = nk$
m' such that $(-M \times m') \bmod 2^k = 1$
Output: $S_n = AB2^{-r} \bmod M$ where $0 \leq S_n < 2M$
1. $S_{-1} = 0$: $bn = 0$:
2. For $i = 0$ to $n$ ---
Algorithm Montgomery Multiplication ---
3. $s_{i-1} = S_{i-1} \bmod 2^k$:
4. $q_{i-1} = m' \times s_{i-1} \bmod 2^k$:
5. $S_i = (S_{i-1} + M \times q_{i-1}) \bmod 2^k + A \times b_i$:

---

Figure 4:
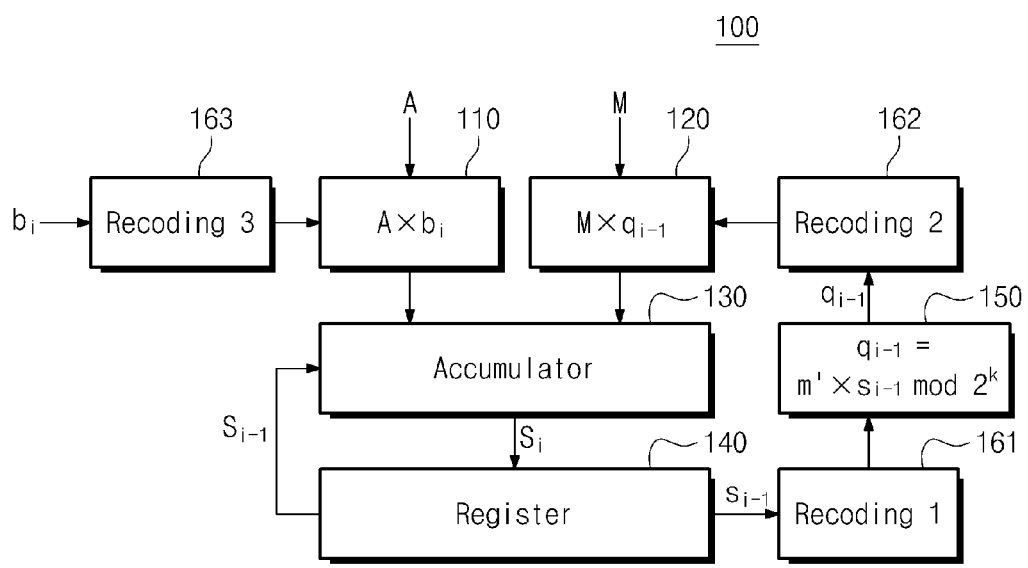
FIG. 4 is a block diagram illustrating an example of a modular multiplier according to an exemplary embodiment.

The structure of the modular multiplier for performing the above-mentioned Montgomery multiplication algorithm is illustrated in FIG. 4.

FIG. 4 is a block diagram illustrating an example of a modular multiplier according to an exemplary embodiment. Referring to FIG. 4, a modular multiplier 100 includes a partial multiplication unit 110, a modulus multiplication unit 120, an accumulator 130, a register 140, a quotient generator 150, a first recoding unit (Recoding 1) 161, a second recoding unit (Recoding 2) 162, and a third recoding unit (Recoding 3) 163.

The partial multiplication unit 110 may multiply a multiplicand A and a multiplier bit $b_i$. The modulus multiplication unit 120 may multiply a modulus M and a multiplier bit $q_{i-1}$. The accumulator 130 receives a previous accumulated value $S_{i-1}$ and output values of the first and second partial multiplication units 110 and 120, and calculates an accumulated value $S_i$ using the above-mentioned Montgomery algorithm. The register 140 stores the calculated accumulated value $S_i$. The quotient generator 150 receives a value obtained by changing a least significant digit of the previous accumulated value $S_{i-1}$, and generates a quotient $q_{i-1}$ using the above-mentioned Montgomery algorithm.

The register 140 outputs a least significant digit (LSD) $s_{i-1}$ of the accumulated value $S_i$ stored in the register 140. A size of the least significant digit $s_i$ is determined by a radix. For example, when the radix is $2^{16}$, the size is 16 bits.

As illustrated in FIG. 4, modular multiplication includes three multiplication operations, i.e. $A \times b_i$, $M \times q_{i-1}$, and $m' \times s_{i-1}$. Here, A and $b_i$ of $A \times b_i$ are not intermediate result values but user input values, and thus may exist in a non-redundant form. By contrast, $q_{i-1}$ of $M \times q_{i-1}$, and $s_{i-1}$ of $m' \times s_{i-1}$ are intermediate result values of previous operations, and thus exist in a redundant form. Therefore, the redundant-form recoding may be applied to $q_{i-1}$ of $M \times q_{i-1}$, and $s_{i-1}$ of $m' \times s_{i-1}$. Here, m' is a least significant digit of a negative inverse of modulus (NIM).

The delay complexities are compared when the RCA, CSA, and RFR are applied to the first recoding unit 161 and the second recoding unit 162, as shown in the following Table 3.

TABLE 3

|  | RCA | CSA | RFR |
| --- | --- | --- | --- |
| Recoding 1 | n | log n | 1 |
| $s_{i-1} \times$ m' | log n | log n | log n |
| Recoding 2 | n | log n | 1 |
| $q_{i-1} \times$ M | log n | log n | log n |
| Accumulator | 1 | 1 | 1 |
| Overall | 2n + 2log n + 1 | 4log n + 1 | 2log n + 3 |

Referring to Table 3, when the RCA and the RFR having similar area complexities are compared, a complexity order is decreased from $\theta(n)$ to $\theta(\log n)$. Further, when compared with the CSA having high area complexity, the delay complexity is decreased by about half.

Here, the RBR is excluded from comparison. This is because redundant recoding including the RBR has not been applied to a typical Montgomery multiplication calculator in order to reduce the delay complexity (that is, a pipelining technique has been frequently applied, but this technique causes overhead such as a hardware size increase or preprocessing operation, and thus the limitation with respect to a delay has not been overcome). That is, a method of applying the redundant-form recoding to the Montgomery multiplication calculator is included as a part of an exemplary embodiment.

Figure 5:
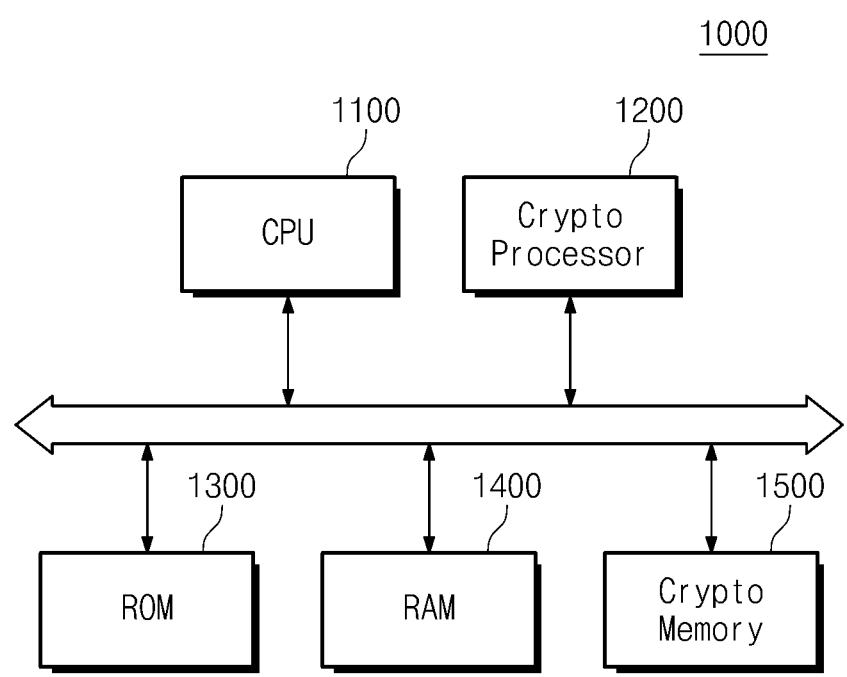
FIG. 5 is a block diagram illustrating an example of a security system according to an exemplary embodiment.

FIG. 5 is a block diagram illustrating an example of a security system including a crypto-processor and a modular multiplier according to an exemplary embodiment. Referring to FIG. 5, the security system 1000 includes a central processing unit (CPU) 1100, a crypto-processor 1200, a ROM 1300, a RAM 1400, and a crypto-memory 1500.

The CPU 1100 controls an overall operation of the security system 1000. The crypto-processor 1200 is controlled by the CPU 1100 to interpret commands for enabling encryption, authentication, and electronic signature and process data. The crypto-processor 1200 performs multiplication operations using the redundant-form recoding according to one or more exemplary embodiments illustrated in FIGS. 1 to 3. The ROM 1300 and the RAM 1400 store data for driving the security system 1000. The crypto-memory 1500 stores data for driving the crypto-processor 1200.

As described above, a multiplication operation is performed using redundant-form recoding according to an exemplary embodiment, and thus a hardware structure can be simplified while achieving improved performance.

The above-disclosed subject matter is to be considered illustrative and not restrictive, and the appended claims are intended to cover all such modifications, enhancements, and other exemplary embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A modular multiplier comprising at least one central processing unit configured to execute instructions to implement:
   a partial multiplication unit configured to multiply a multiplier and a multiplicand bit;
   a modulus multiplication unit configured to multiply a modulus and a transformed quotient bit;
   an accumulator configured to receive a previous accumulated value and output values of the partial multiplication unit and the modulus multiplication unit, and calculate an accumulated value according to a Montgomery algorithm;
   a register configured to store the accumulated value calculated by the accumulator;
   a first recoding unit configured to transform the previous accumulated value by adding a recoding constant to the redundant-form previous accumulated value, and recode the transformed previous accumulated value;
   a quotient generator configured to generate a redundant-form quotient using the previous accumulated value; and
   a second recoding unit configured to transform the redundant-form quotient by adding a recoding constant thereto, and recode the transformed quotient, wherein the transformed quotient bit has a value of the output of the second recoding unit.

2. The modular multiplier of claim 1, wherein each of the first and second recoding units comprises:
   a first column in which half adders and modified half adders are repeatedly alternately arranged; and
   a second column in which full adders and half adders are repeatedly alternately arranged,
   wherein the modified half adder adds a first input bit, a second input bit, and 1.

3. The modular multiplier of claim 1, wherein each of the first and second recoding units comprises:
   a first column in which inverters are intermittently arranged; and
   a second column in which full adders are repeatedly arranged.

4. The modular multiplier of claim 1, wherein a size of the recoding constant is the same as a size of the multiplicand.

5. The modular multiplier of claim 1, wherein the quotient generator uses a value obtained by recoding a least significant digit of the previous accumulated value as a multiplier.

6. The modular multiplier of claim 5, wherein the value obtained by recoding the least significant digit exists in a redundant form.

7. A public key calculator that calculates a public key, the calculator comprising:
   a central processing unit;
   a crypto-memory; and
   a crypto-processor that comprises:
      a partial multiplication unit configured to multiply a multiplier and a multiplicand bit of the public key;
      a modulus multiplication unit configured to multiply a modulus and a transformed quotient bit;
      an accumulator configured to receive a previous accumulated value and output values of the partial multiplication unit and the modulus multiplication unit, and calculate an accumulated value according to a Montgomery algorithm;
      a register configured to store the calculated accumulated value;
      a first recoding unit configured to transform the previous accumulated value by adding a recoding constant to the redundant-form previous accumulated value;
      a quotient generator configured to generate a redundant-form quotient using the previous transformed accumulated value; and
      a second recoding unit configured to transform the redundant-form quotient by adding a recoding constant to the redundant-form quotient,
   wherein the transformed quotient bit has a value of output of the second recoding unit, and
   wherein the central processing unit receives a request to calculate a public key, and the central processing unit calculates the public key using the crypto-processor.

8. The public key calculator of claim 7, wherein the public key is at least 1024 bits.

9. The public key calculator of claim 7, wherein a size of the recoding constant is the same as that of the multiplicand.

10. The public key calculator of claim 9, wherein each of the first and second recoding units comprises:
    a first column in which half adders and modified half adders are repeatedly alternately arranged; and
    a second column in which full adders and half adders are repeatedly alternately arranged,
    wherein the modified half adder adds a first input bit, a second input bit, and 1.

11. The public key calculator of claim 9, wherein each of the first and second recoding units comprises:
    a first column in which inverters are intermittently arranged; and
    a second column in which full adders are repeatedly arranged.

* * * * *